United States Patent [19]
Vollberg et al.

[11] Patent Number: 4,658,466
[45] Date of Patent: Apr. 21, 1987

[54] BLOCKING DEVICE FOR THE WHEELS AND WHEEL FRAMES OF CASTERS

[75] Inventors: Fritz Vollberg, Wermelskirchen; Lothar Steinhaus, Remscheid, both of Fed. Rep. of Germany

[73] Assignee: Albert Schulte Söhne GmbH & Co., Wermelskirchen, Fed. Rep. of Germany

[21] Appl. No.: 723,249

[22] Filed: Apr. 15, 1985

[30] Foreign Application Priority Data

Apr. 14, 1984 [DE] Fed. Rep. of Germany ....... 3414282

[51] Int. Cl.⁴ ............................................. B60B 33/00
[52] U.S. Cl. ........................................ 16/35 R; 16/19
[58] Field of Search ....................... 16/35 R, 35 D, 19

[56] References Cited

U.S. PATENT DOCUMENTS

| 2,384,020 | 9/1945 | Farson | 16/19 |
| 3,162,888 | 12/1964 | Mokus | 16/35 R |
| 3,571,842 | 3/1971 | Fricke | 16/35 R |
| 3,656,203 | 4/1972 | Waflart, Jr. | 16/35 R |
| 3,890,669 | 6/1975 | Reinhards | 16/35 R |
| 3,911,525 | 10/1975 | Haussels | 16/35 R |
| 3,988,800 | 11/1976 | Sachser | 16/35 R |
| 4,349,937 | 9/1982 | Fontana | 16/35 R |

Primary Examiner—Donald R. Schran
Assistant Examiner—James L. Wolfe
Attorney, Agent, or Firm—Peter K. Kontler

[57] ABSTRACT

A caster wherein the wheel can be braked by a reciprocable or pivotable brake shoe and the wheel frame can be held against swiveling relative to its carrier by an integral part of the carrier in cooperation with a reciprocable or pivotable component which shares the swiveling movements of the wheel frame and can directly or indirectly engage the internal teeth of such integral part. The integral part of the carrier and the reciprocable or pivotable component are installed in a chamber which is defined by the carrier and the wheel frame. The reciprocable or pivotable component is connected to the wheel frame in a plane which is different from the plane of the integral part of the carrier so that the forces which develop when the device including the integral component of the frame and the reciprocable or pivotable component is called upon to hold the wheel frame against swiveling movement are not concentrated in a single portion of such device. This allows for the making of the constituents of such blocking device from inexpensive synthetic plastic materials.

19 Claims, 7 Drawing Figures

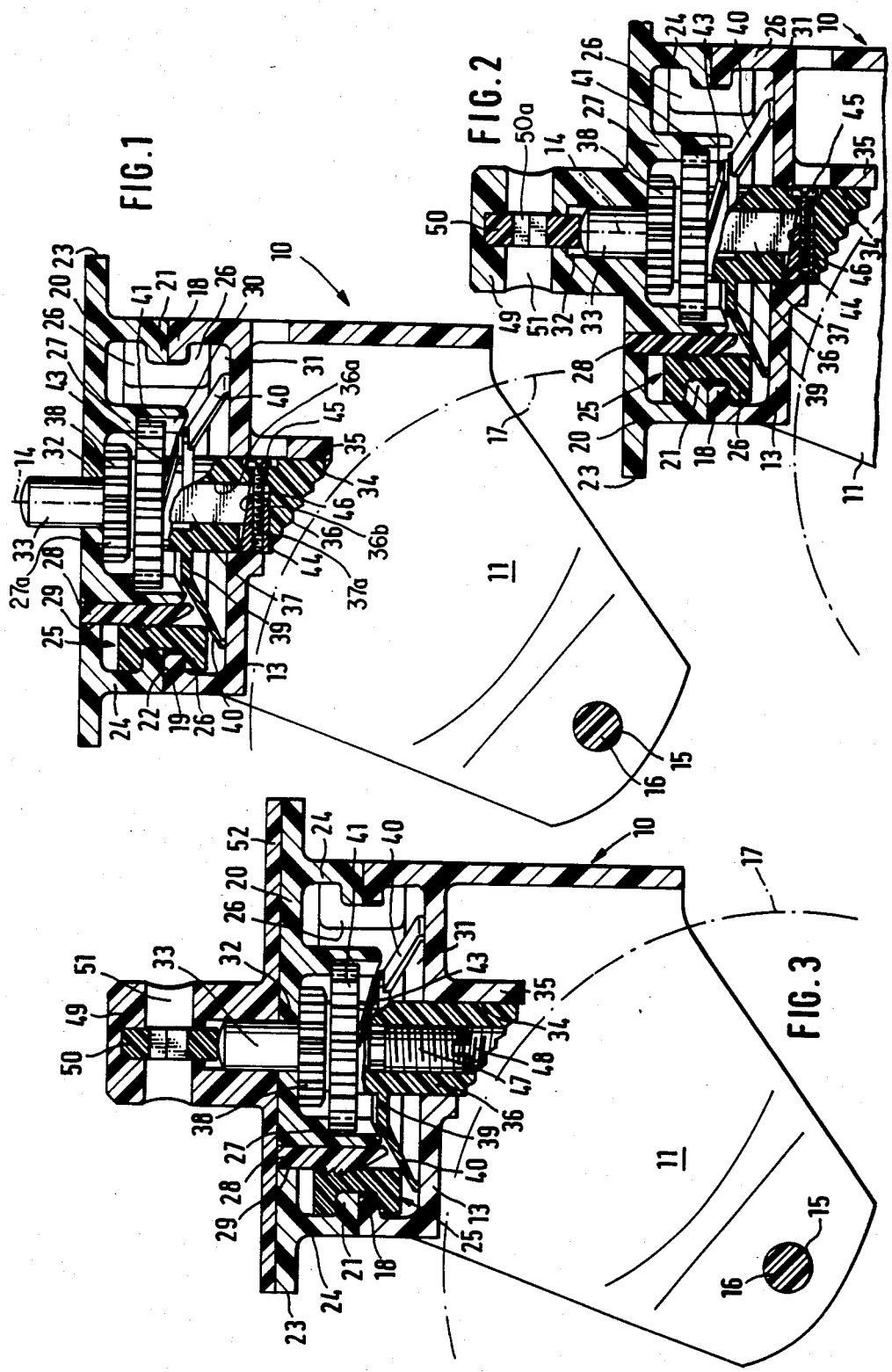

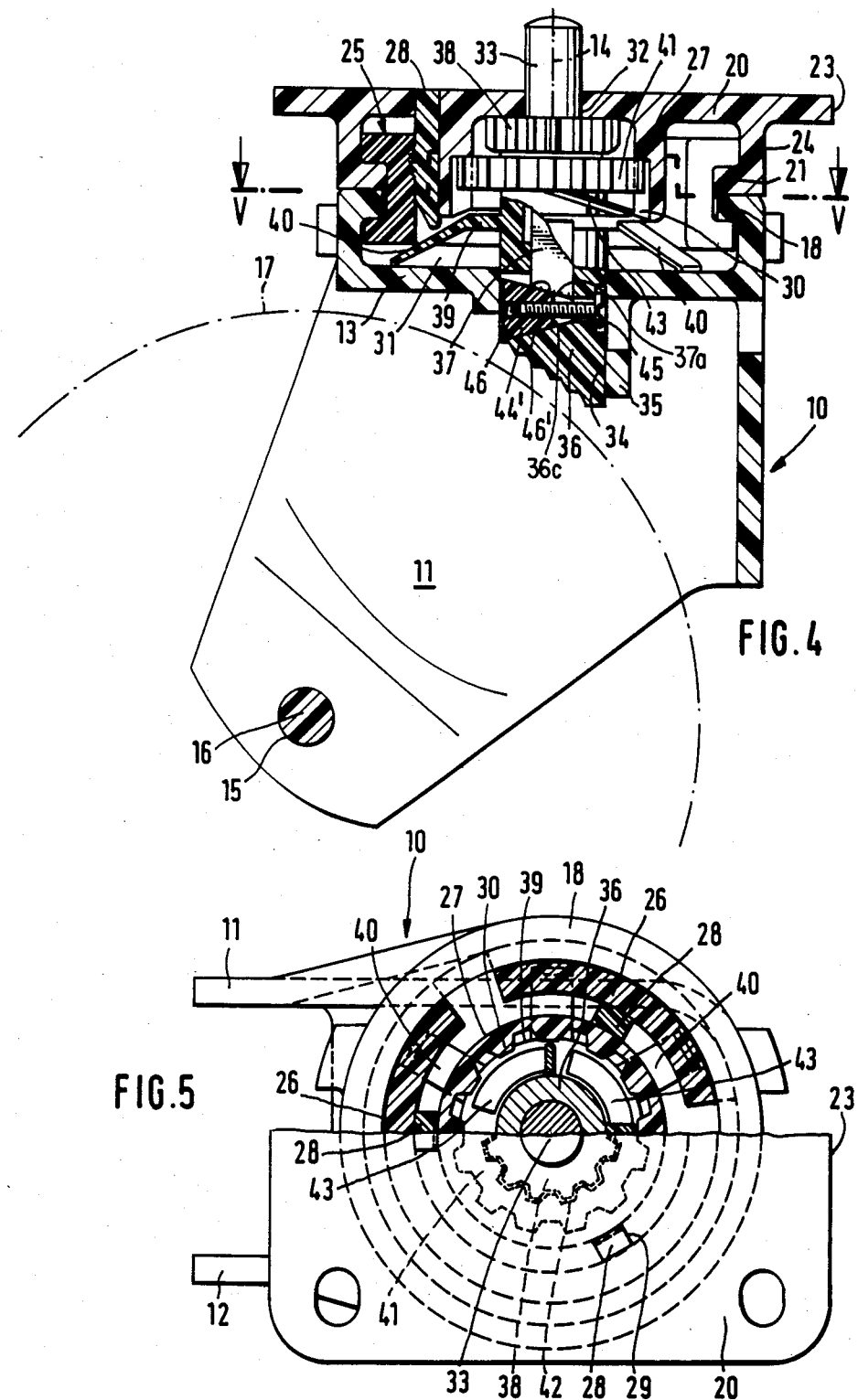

BLOCKING DEVICE FOR THE WHEELS AND WHEEL FRAMES OF CASTERS

CROSS-REFERENCE TO RELATED CASES

The caster of the present invention constitutes an improvement and a further development of casters which are disclosed in the commonly owned copending patent application Ser. No. 675,525 filed Nov. 28, 1984 by Herbert Sachser and in the commonly owned copending patent application Ser. No. 699,795 filed Feb. 8, 1985 by Fritz Vollberg et al.

BACKGROUND OF THE INVENTION

The present invention relates to casters in general, and more particularly to improvements in blocking devices which serve to oppose rotation of the wheel and/or swiveling of the wheel frame in a caster for use on vehicles, pieces of furniture, appliances and the like.

It is already known to install a portion of the blocking device for the wheel and wheel frame of a caster in a cavity or chamber between the frame and a carrier which supports the frame and to which the frame is connected for swiveling movement about the axis of a thrust bearing. In accordance with a presently known proposal, the web of the bifurcated wheel frame is rigidly connected with a turntable which can swivel relative to the carrier between an upper and a lower annulus of antifriction rolling elements. A braking lever is installed in the wheel frame at a level below the web and is movable into frictional engagement with the peripheral surface of the wheel by a bolt which extends through the carrier, through the turntable and through the web of the wheel frame. The bolt is reciprocable in a sleeve which is surrounded by a plate-like blocking member. The blocking member is movable in the axial direction of but cannot rotate relative to the sleeve and is non-rotatably connected with the bolt in such a way that it can yield by moving upwardly under the action of a spring. The periphery of the blocking plate is formed with an annulus of gear teeth which can mate with an annulus of internal teeth in the platform to thus hold the wheel frame against swiveling movement with reference to the carrier. The plane in which the blocking plate is held against rotation relative to the bolt coincides with the plane in which the blocking plate is held against angular movement with reference to the sleeve. This entails unavoidable weakening of the blocking plate which is particularly undesirable if the blocking plate and other parts of the blocking device are made of relatively inexpensive materials in order to reduce the overall cost of the caster. It has been found that, when using relatively soft synthetic plastic materials, the component parts of the blocking device tend to undergo extensive deformation which is likely to prevent the device from properly opposing or preventing swiveling movements of the wheel frame with reference to its carrier.

OBJECTS AND SUMMARY OF THE INVENTION

An object of the invention is to provide a caster wherein the blocking device for the wheel and wheel frame is constructed and assembled in such a way that the blocking force between the carrier and the wheel frame can be transmitted in several planes to thus avoid excessive stressing and eventual deformation of discrete components of the blocking device.

Another object of the invention is to provide a novel and improved blocking device for use in a caster which can be mounted on a piece of furniture, an appliance, a conveyance or the like.

A further object of the invention is to provide the blocking device with novel and improved means for opposing swiveling movements of the wheel frame with reference to its carrier.

An additional object of the invention is to provide novel and improved means for actuating the moving parts of the blocking device.

Still another object of the invention is to provide a blocking device whose operation is reliable and which can stand long periods of use even if its component parts are made of an inexpensive synthetic plastic material.

An additional object of the invention is to provide a novel and improved method of blocking swiveling movements of the wheel frame relative to its carrier in a caster for pieces of furniture and the like.

Another object of the invention is to provide the blocking device with novel and improved means for compensating for wear upon the wheel braking means.

Still another object of the invention is to provide the blocking device with a novel and improved brake for the wheel of the caster.

A further object of the invention is to provide a simple, compact and inexpensive blocking device which can be installed in existing types of casters as a superior substitute for heretofore known blocking devices.

The invention is embodied in a caster which comprises a wheel frame having at least one arm, a wheel which is mounted on the arm for rotation about a first axis, a carrier for the frame (such carrier can be secured to the leg of a piece of furniture), a thrust bearing which is provided on the frame and on the carrier and defines for the frame a swivel axis which is normal or substantially normal to the first axis, and a device which is designed to selectively permit and prevent rotation of the wheel and swiveling of the frame. The device includes a first component a portion of which is rigid with the carrier, a second component which is movably mounted on and shares the movements of the frame about the swivel axis, and actuating means for moving the second component between a first position in which the first component holds the second component and the frame against swiveling and a second position in which the second component and the frame are free to swivel relative to the carrier. The components of the improved device are preferably installed in a chamber or space which is defined by the frame and the carrier.

The first component preferably includes a first gear and the second component can have at least one tooth which is movable by the actuating means into and from engagement with the teeth of the first gear. The first component can further include a second gear which mates with the first gear and is integral with the carrier (such second gear can form part of the aforementioned portion which is rigid with the carrier). The second gear can constitute an internal gear and the second component can include a third gear which is held against rotation by the first gear in the first position of the second component. The actuating means then preferably comprises a shifting member which is non-rotatably mounted in the frame for movement in the direction of the swivel axis and carries the third gear which is thereby movable into and from mesh with the first gear in response to axial movement of the shifting member to a predetermined axial position. The aforementioned device preferably further comprises a braking member (e.g., a brake shoe) which is movable by the shifting member into and from frictional engagement with the wheel, e.g., with the peripheral surface of the wheel. Means can be provided for yieldably biasing the braking member away from engagement with the wheel.

In accordance with one presently preferred embodiment of the invention, the braking member is non-rotatably mounted in the wheel frame and the first gear is preferably provided with internal teeth mating with the teeth of the third gear in the predetermined position of the shifting member (i.e., in the first position of the second component). The first gear is movable axially of the second gear and a set of springs or other resilient means can be interposed between the first gear and the braking member to urge the first gear in the direction of the swivel axis and away from the braking member.

The braking member is preferably mounted on and is adjustable with reference to the shifting member in the direction of the swivel axis, e.g., to compensate for wear upon the braking member. Such caster preferably further comprises means for adjusting the braking member with reference to the shifting member. The adjusting means can comprise a wedge which is movably installed in the braking member and cooperates with a suitable follower of the shifting member to move the latter in the direction of the swivel axis in response to movement of the wedge relative to the braking member. The wedge can have two mutually inclined cam faces one of which engages the follower of the shifting member and the other of which engages with a portion of the braking member. Alternatively, the shifting member can include a first threaded portion (e.g., an externally threaded shank) and the braking member can comprise a second threaded portion (e.g., a nut) in mesh with the first threaded portion to effect a movement of the braking member in the direction of the swivel axis in response to rotation of one of the two threaded portions relative to the other threaded portion.

The shifting member can include an end portion which extends from the carrier and the actuating means can further comprise means for moving the end portion of the shifting member in the direction of the swivel axis. Such caster can further comprise a housing (e.g., a bearing pin which is integral with or is separably secured to the carrier and can be received in a socket at the lower end of the leg of a piece of furniture); the moving means for the end portion of the shifting member then preferably comprises a rotary cam which is installed in the housing and whose periphery is tracked by the end portion of the shifting member so that the latter is caused or permitted to move in the direction of the swivel axis in response to rotation of the cam relative to its housing.

In accordance with a different embodiment of the improved caster, the second component includes a lever which is pivotably mounted in the frame so as to share the swiveling movements of the frame with reference to the carrier and has an arm which is movable into and from engagement with the first component in response to pivoting of the lever by the actuating means. The lever preferably further comprises a second or braking portion which is movable into and from frictional engagement with the peripheral surface or another portion of the wheel in response to pivoting of the lever. Such caster can further comprise means (e.g., a further arm of the lever) for yieldably biasing the lever to an angular position in which the braking portion is disengaged from the wheel. The actuating means can include a cam which is turnably mounted in the frame and has a cam face tracked by a follower of the lever. The cam face can include a first portion which is engaged by the follower when the biasing means is free to disengage the braking portion from the wheel, a second portion which is engaged by the follower when the arm engages the first component, and a third or intermediate portion (e.g., a lobe) which must be tracked by the follower of the lever against the opposition of the biasing means in order to engage the follower with one of the first and second portions.

The novel features which are considered as characteristic of the invention are set forth in particular in the appended claims. The improved blocking device itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary vertical sectional view of a caster and a partly elevational and partly sectional view of a blocking device which embodies one form of the invention and wherein the second component is movable relative to the first component by a reciprocable shifting rod;

FIG. 2 is a fragmentary sectional view of a caster having a modified blocking device wherein the shifting rod is reciprocable by a rotary cam mounted in a housing at the top of the carrier;

FIG. 3 illustrates a second modification of the structure of FIG. 1 wherein the shifting rod and the braking member for the wheel are threadedly connected to each other;

FIG. 4 shows the structure of FIG. 1 except that the means for adjusting the braking member relative to the shifting rod employs a different wedge;

FIG. 5 is a partial top plan and partial horizontal sectional view of the caster which is shown in FIG. 4, the section being taken in the direction of arrows as seen from the line V—V of FIG. 4;

DESCRIPTION OF THE PREFERRED EMBODIMENTS

Figure 6:
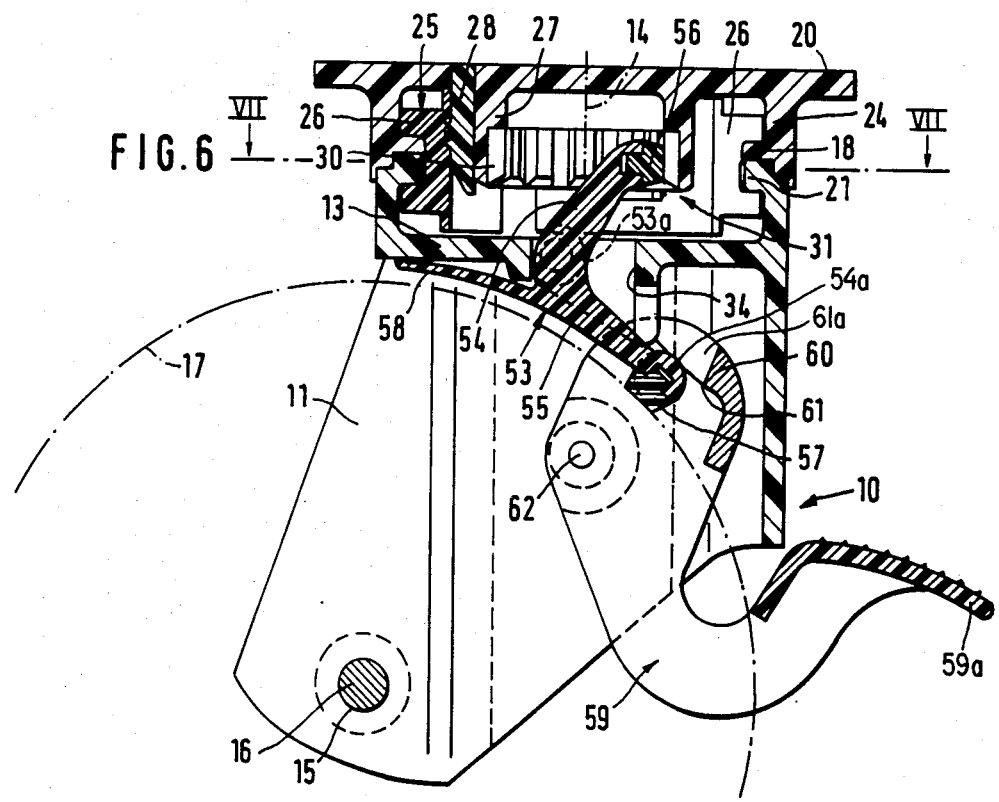
FIG. 6 is a fragmentary vertical sectional view of a caster wherein the second component of the blocking device includes a lever which is pivotably mounted in the wheel frame.

FIG. 1 shows a portion of a caster which comprises a bifurcated wheel frame 10 having two arms or prongs 11, 12 (the prong 12 can be seen in FIGS. 5 and 7) and a web 13. The arms 11, 12 have registering holes 15 for a shaft 16 which carries a wheel 17 (indicated by a phantom line). The axis of the wheel 17 is remote from and is normal to the swivel axis 14 of the frame 14, and such swivel axis is defined by the web 13 in conjunction with a carrier 20 which supports the frame 10 and can be affixed to the leg of a piece of furniture, to the underside of an appliance, to a conveyance or to any other part which is to be rolled around on one or more casters. More specifically, the swivel axis 14 is defined by a plain friction bearing including a portion which is integral with the web 13 of the frame 10, a portion which is integral with the carrier 20, and a composite ring-shaped coupling member 25 which holds the adjacent portions of the frame 10 and carrier 20 against axial movement away from each other. The web 13 has an upwardly extending cylindrical portion or extension with an inwardly extending annular collar 18 whose upper side 19 abuts against the underside 22 of an inwardly extending collar 21 at the lower end of a cylindrical extension or intermediate portion 24 of a plate-like top portion 23 of the carrier 20. The collars 18, 21 and the coupling member 25 can be said to constitute the thrust bearing which defines the swivel axis 14 for the frame 10 and which prevents the web 13 from moving axially and away from the carrier 20. The collar 21, the intermediate portion 24 and the plate-like portion 23 of the carrier 20 can be made of a single piece of a suitable synthetic plastic material. The entire frame 10 can also consist of a single piece of synthetic plastic material.

The coupling member 25 is assembled of several (e.g., three) arcuate sections 26 each of which has a substantially U-shaped cross-sectional outline. The arcuate sections 26 spacedly surround a centrally located annular hub 27 which has an annulus of internal teeth 30 and is integral with the plate-like portion 23 of the carrier 20. The hub 27 is located in a chamber or space 31 which is defined by the web 13 of the frame 10 and the carrier 20 and serves to confine the component parts of a novel and improved blocking device which can be utilized to selectively permit or prevent rotation of the wheel 17 about the axis of the shaft 16 and/or to selectively prevent or permit swiveling movements of the frame 10 and wheel 17 about the axis 14.

The parts of the blocking device further include a gear 41, a gear 38 and an actuating means in the form of a rod-shaped shifting member 33 whose axis coincides with the swivel axis 14, which is nonrotatably mounted in the frame 10 and which is rotatable with reference to the carrier 20 in one of its axial positions, namely when the frame 10 is free to swivel with reference to the carrier 20 and/or vice versa. Such axial position of the shifting member 33 is shown in FIG. 1. When the shifting member 33 assumes the other axial position, the external teeth of the gear 38 (which is or can be rigidly affixed to the shifting member 33) mate with the internal teeth 42 (FIG. 5) of the gear 41 so that the latter prevents rotation of the frame 10, about the swivel axis 14. The blocking device can be said to comrpise two distinct components, namely a first component including a first gear (41) and a second gear (30) which is in permanent mesh with the first gear, and a second component including the (third) gear 38 which is movable between a first position of mesh with the internal teeth 42 of the gear 41 and a second position which is shown in FIG. 1 and in which the gear 38 is located at a level above and can rotate with reference to the gears 30 and 41.

The peripheral surface of the hub 27 (constituting that portion of the first component of the blocking device which is integral with the carrier 20) serves as an abutment for several wedges 28 which are introduced into complementary apertures 29 in the plate-like top portion 23 of the carrier 20 and serve to hold the sections 26 of the coupling member 25 against movement radially inwardly of and away from engagement with the adjacent portions of the collars 18 and 21. As can be seen in FIG. 1, each wedge 28 is provided with serrations which engage complementary serrations at the inner sides of the respective sections 26 to prevent any undesirable displacements of such sections in the chamber 31. Reference may be had to the disclosure of the aforementioned commonly owned copending patent application Ser. No. 699,795 of Fritz Vollberg et al. The serrations of the sections 26 and the surfaces surrounding the apertures 29 hold the respective wedges 28 against any stray movements relative to the carrier 20.

The upper portion of the shifting member 33 is reciprocable and rotatable in a centrally located bore or hole 32 of the plate-like top portion 23 of the carrier 20. The central portion of the web 13 is formed with a non-circular (e.g., square or rectangular) passage 34 which is surrounded by a wall 35 and reciprocably receives the upper portion of a braking member in the form of a brake shoe 36. The upper portion of the brake shoe 36 has an outline which is complementary to the outline of the surface bounding the passage 34 so that the brake shoe cannot rotate with reference to the frame 10. The lower portion (not shown) of the brake shoe 36 moves into frictional engagement with the peripheral surface of the wheel 17 when the shifting member 33 is depressed to move the second component (gear 38) of the blocking device into mesh with the internal teeth 42 of the gear 41 (i.e., when the gear 41 cooperates with the second gear 30 of the first component of the blocking device to prevent angular movements of the frame 10 about the swivel axis 14). The upper portion of the brake shoe 36 has a blind hole or bore 36a for a complementary lower portion 37 of the shifting member 33, i.e., the parts 33 and 36 cannot rotate with reference to each other. The gear 38 can be integral or rigidly affixed to the upper portion of the brake shoe 36 or directly to the shifting member 33; in either event, the gear 38 is compelled to share the movements of the shifting member 33 and the brake shoe 36 in the direction of the swivel axis 14. In the embodiment of FIG. 1, the gear 38 is an externally toothed flange at the upper end of the brake shoe 36.

The upper portion of the brake shoe 36 further includes a separately manufactured or integral disc 39 having radially outwardly and downwardly extending elastic fingers 40 which bear against the upper side of the web 13 and thus constitute a means for yieldably biasing the brake shoe 36 upwardly and away from contact with the peripheral surface of the wheel 17. The elastic fingers 40 are preferably equidistant from each other, as considered in the circumferential direction of the shifting member 33, and must undergo deformation (i.e., they must store energy) in order to move the lower portion of the brake shoe 36 into actual contact with the wheel 17. In other words, the elastic fingers 40 of the disc 39 on the brake shoe 36 constitute a means for normally maintaining the shifting member 33 in the upper end position of FIG. 1 in which the gear 38 is disengaged from the gear 41 (so that the frame 10 can swivel with reference to the carrier 20) and in which the brake shoe 36 is disengaged from the wheel 17 (so that the latter can rotate about the axis of the shaft 16).

The underside of the gear 41 is provided with or connected to a set of arcuate elastic projections or tongues 43 which are equidistant from each other (as considered in the circumferential direction of the shifting member 33) and bear against the upper side of the disc 39 on the brake shoe 36 so that they tend to move the gear 41 upwardly and away from the brake shoe, namely to the position of FIG. 1 in which the upper side of the gear 41 abuts against an internal shoulder 27a of the hub 27. The purpose of the elastic projections 43 is to ensure that, if necessary, the gear 41 can move downwardly from the upper end position of FIG. 1 (while remaining in mesh with the gear 30 of the hub 27) when the shifting member 33 and the brake shoe 36 move downwardly. The gear 41 moves downwardly under the action of the descending gear 38 until the teeth of the gear 38 find the tooth spaces between the internal teeth 42 of the gear 41, whereupon the gear 38 penetrates into the gear 41 and the gears 38, 41, 30 and the hub 27 cooperate to hold the frame 10 against swiveling with reference to the carrier 20. The elastic projections 43 are free to return the gear 41 to the upper end position of FIG. 1 as soon as the teeth 38 of the gear 38 begin to mate with the internal teeth 42. The manner in which the shifting member 33 can be caused to move downwardly is not specifically shown in FIG. 1; the means for moving the member 33 can be identical with the means including a rotary cam 50 shown in FIG. 2.

The caster of FIG. 1 further comprises means for adjusting the position of the brake shoe 36 with reference to the shifting member 33 in the direction of the swivel axis 14. Such adjustment is desirable from time to time in order to compensate for wear upon the peripheral surface of the wheel 17 and/or upon the adjacent surface of the brake shoe 36. The adjusting means of FIG. 1 comprises a wedge 44 which extends into a transversely extending tunnel or hole 36b of the shifting member 33. The hole 36b extends substantially at right angles to the swivel axis 14 and the inclined upper side or cam face 46 of the wedge 44 is contacted by the adjacent similarly inclined follower portion 37a of the lower end portion 37 of the shifting member 33. The position of the wedge 44 can be selected and fixed by a screw 45 which can move the wedge 44 in a direction to the left or to the right, as viewed in FIG. 1, to thereby move the brake shoe 36 downwardly or upwardly. The elastic fingers 40 of the disc 39 urge the inclined face 46 of the wedge 44 against the follower portion 37a of the non-circular portion 37 of the shifting member 33.

The caster which is shown in FIGS. 4 and 5 distinguishes from the caster of FIG. 1 in that the means for adjusting the position of the brake shoe 36 relative to the shifting member 33 comprises a modified wedge 44' with two mutually inclined surfaces 46, 46'. The surface 46 cooperate with the adjacent similarly inclined surface or follower portion 37a of the non-circular lower end portion 37 of the shifting member 33, and the surface 46' cooperates with a similarly inclined surface 36c of the brake shoe 36. The adjusting means of FIGS. 4 and 5 can shift the brake shoe 36 to a greater distance than the wedge 44 of FIG. 1.

The means for adjusting the position of the brake shoe 36 with reference to the shifting member 33 of the caster which is shown in FIG. 3 comprises an externally threaded portion or shank 47 which constitutes the lower end portion of the shifting member 33, and an internally threaded portion of the brake shoe 36 which is provided with a tapped bore 48 for the externally threaded portion 47. The lower end face of the externally threaded portion 47 has a diametrically extending slot for the working end of a screwdriver or an analogous tool which can be used to rotate the shifting member 33 and to thereby move the brake shoe 36 upwardly or downwardly, i.e., further away from or nearer to the peripheral surface of the wheel 17.

FIGS. 1 and 4 show that the upper end portion of the shifting member 33 extends upwardly and beyond the hole or bore 32 in the plate-like top portion 23 of the carrier 20. The means for depressing the shifting member 33 is not specifically shown. FIGS. 2 and 3 illustrate a hollow inverted cup-shaped housing 49 which can constitute a bearing pin and receives the upper end portion of the respective shifting member 33. The housing 49 has a transversely extending opening 51 which affords access to the non-circular hole 50a of a rotary cam 50 which is installed in the housing 49 and can be rotated by a suitable tool (not shown) which is turnable about an axis extending at right angles to the swivel axis 14 so as to change its angular position and to thereby change the axial position of the shifting member 33 whose upper end portion can be said to constitute a follower for the peripheral surface of the cam 50. The configuration of the peripheral surface of the cam 50 is such that the latter can move the shifting member 33 downwardly from the upper end position of FIGS. 2 or 3 and to thus place the gear 38 (second component of the blocking device) into mesh with the internal teeth 42 of the first gear 41 of the first component of such device in a manner as described in connection with FIG. 1.

In the embodiment of FIG. 2, the housing 49 is an integral part of the plastic carrier 20. In the embodiment of FIG. 3, the housing 49 is an integral part of a plate 52 which overlies the upper side of the plate-like top portion 23 of the carrier 20 and is affixed to the carrier in a manner not specifically shown in the drawing. The outline of the plate 52 preferably matches the outline of the plate-like top portion 23. The housing 49 of FIGS. 2 or 3 can constitute a bearing pin which is receivable in a socket in the bottom surface of the leg of a piece of furniture or the like.

In each of the embodiment which are shown in FIGS. 1 to 5, the shifting member 33 is located in its upper end position in which the blocking device is ineffective because the gear 38 is out of mesh with the teeth 42 of the gear 41 and the lower end portion of the brake shoe 36 is out of contact with the respective wheel 17. Thus, the wheel frame 10 can swivel with reference to the carrier 20 about the axis 14 and the wheel 17 is free to rotate about the axis of the shaft 16. As mentioned above, all that is necessary to block rotation of the wheel 17 and swiveling movements of the wheel frame 10 is to move the shifting member 33 downwardly, as viewed in FIGS. 1, 2, 3 or 4, so that the teeth of the gear 38 (immediately or eventually) engage the internal teeth 42 of the gear 41 (which is in permanent mesh with the gear 30 of the hub 27 on the carrier 20) and the brake shoe 36 moves into frictional engagement with the wheel 17. The gear 41 can leave its upper end position (of abutment with the internal shoulder 27a of the hub 27) in response to downward movement of the gear 38 if the teeth of the gear 38 fail to immediately penetrate into the tooth spaces between the internal teeth 42 of the gear 41. This causes the elastic projections 43 to store energy and to return the gear 41 to the upper end position as soon as the gear 41 begins to mate with the gear 38. In other words, it can happen that the shoe 36 begins to brake the wheel 17 before the gears 30, 38, 41 and hub 27 start to block angular movements of the frame 10 with reference to the carrier 20. As a rule, the gear 38 penetrates into the gear 41 immediately or almost immediately in response to downward movement of the shifting member 33 because a minute angular movement of the gear 41 relative to the gear 38 suffice to move the internal teeth 42 of the gear 41 into mesh with the spaces between the external teeth of the gear 38. During downward movement of the gear 41, the elastic projections 43 at the underside of the gear 41 slide along the upper side of the disc 39 on the brake shoe 36.

The feature that the first component of the improved blocking device comprises a hub 27 which is integral with the carrier 20 and has a large-diameter internal gear 30 is desirable and advantageous because it ensures that the moment (tangential force) which is generated as a result of swiveling of the frame 10 with reference to the carrier 20 is transmitted to a large-diameter integral part 27, 30 of the carrier 20 when the swiveling movement of the frame is to be brought to a halt. This ensures that each portion of the large-diameter hub 27 is subjected to the action of a relatively small force when the angular movements of the frame 10 are to be blocked. Therefore, the hub 27, and hence the entire carrier 20, can be made of a relatively inexpensive material, such as a readily available and inexpensive synthetic plastic substance. In fact, the frame 10, the carrier 20 as well as the parts of the blocking device can all be made of a suitable synthetic plastic material. Moreover, the blocking device comprises a relatively small number of simple, compact and inexpensive parts which need not be individually affixed to the carrier 20 and/or frame 10, i.e., they are held in assembled condition by the clamping member 25 which is needed anyway in order to maintain the thrust bearing of the caster in properly assembled and operative position.

Figure 7:
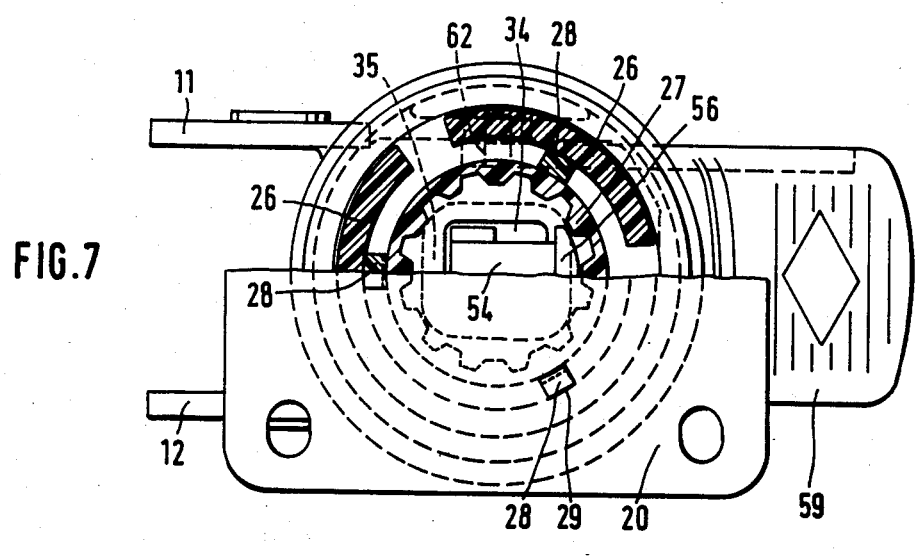
FIG. 7 is a partial plan and partial horizontal sectional view of the caster of FIG. 6, the section being taken in the direction of arrows as seen from the line VII—VII of FIG. 6.

FIGS. 6 and 7 illustrate a portion of a further caster wherein the first component of the blocking device comprises only the hub 27 and its internal gear 30 and the second component of the blocking device comprises a three-armed lever 53 pivotable on a pin 53a which is mounted in the frame 10 so that the lever 53 shares all movements of the frame 10 about the swivel axis 14. One arm 54 of the lever 53 extends upwardly through the passage 34 of the web 13 and has one or more teeth 56 which can move into mesh with the adjacent teeth of the internal gear 30 of the hub 27 on the carrier 20 so that the frame 10 is then held against swiveling relative to the frame. The hub 27, its gear 30 and the upper portion of the arm 54 with its tooth or teeth 56 are located in the chamber 31 between the frame 10 and the carrier 20.

A second arm 55 of the lever 53 constitutes a braking portion having a suitable wear-resistant insert or lining 57 which can engage the peripheral surface of the wheel 17 when the tooth or teeth 56 of the arm 54 mate with the adjacent teeth of the gear 30. A third arm 58 of the lever 53 is elastic and bears against the underside of the web 13 to permanently but yieldably urge the braking portion 55 away from engagement with the wheel 17. FIG. 6 shows the lever 53 in the operative position, i.e., the elastic arm 58 stores energy because the tooth or teeth 56 of the arm 54 are in mesh with the adjacent teeth of the gear 30 and the lining or insert 57 of the braking portion or arm 55 engages the periphery of the wheel 17, i.e., the frame 10 cannot swivel relative to the carrier 20 and the wheel 17 cannot rotate about the axis of the shaft 16.

The means for actuating (pivoting) the lever 53 comprises a second lever 59 which is pivotably mounted in the frame 10, as at 62, and has an arm or pedal 59a which can be manipulated by hand, by foot or in any other suitable way to move the lever 53 between the illustrated angular position and a second angular position. The shorter arm of the actuating lever 59 constitutes or carries a cam 60 having a cam face 61 which is tracked by a follower 54a of the arm 54. The cam face 61 has a first end portion or notch which receives the follower 54a when the lever 53 assumes the position of FIG. 6, a second end portion or notch which receives the follower 54a when the lever 53 is disengaged from the gear 30 and wheel 17, and a centrally located third portion or lobe 61a between the two end portions. The follower 54a must advance over the lobe 61a in order to reach the one or the other end position. The purpose of the lobe 61a is to ensure that the lever 53 cannot accidentally leave the one or the other end position. If the arm 59a of the lever 59 is moved upwardly, the follower 54a is caused to ride over the lobe 61 and to enter the other end portion or notch of the cam face 61 in which the tooth or teeth 56 are disengaged from the adjacent teeth of the gear 30 and the lining or insert 57 is disengaged from the peripheral surface of the wheel 17. The elastic arm 58 ensures that the follower 54a remains in continuous contact with the cam face 61.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A caster, comprising a frame including at least one arm; a wheel mounted on said arm for rotation about a first axis; a carrier for said frame, said carrier and said frame defining a chamber and including portions surrounding said chamber and together forming part at least of a thrust bearing defining for said frame a swivel axis which is normal to said first axis; and a device for selectively permitting and preventing rotation of said wheel and swiveling of said frame, including a first component disposed in said chamber and having a portion which is rigid with said carrier, a second component disposed in said chamber and movably mounted on and sharing the movements of said frame about said swivel axis, and actuating means for moving said second component between a first position in which said first component holds said second component and said frame against swiveling and a second position in which said second component and said frame are free to swivel relative to each other.

2. The caster of claim 1, wherein said first component includes a first toothed gear and said second component includes at least one tooth movable into and from engagement with the teeth of said gear.

3. The caster of claim 2, wherein said first component further includes a second toothed gear mating with said first gear and being integral with said carrier.

4. The caster of claim 2, wherein said second gear is an internal gear.

5. The caster of claim 4, wherein said second component includes a third toothed gear which is held against rotation by said first gear in the first position of said second component, said actuating means comprising a shifting member non-rotatably mounted in said frame for movement in the direction of said swivel axis and carrying said third gear, said device further comprising a braking member which is moveable by said shifting member into and from frictional engagement with said wheel.

6. The caster of claim 5, further comprising means for yieldably biasing said braking member away from engagement with said wheel.

7. The caster of claim 6, wherein said braking member is non-rotatably mounted in said frame and said first gear has internal teeth mating with the teeth of said third gear in the first position of said second component.

8. The caster of claim 7, wherein said first gear is movable axially with reference to said second gear and further comprising resilient means interposed between said first gear and said braking member to urge said first gear in the direction of said swivel axis and away from said braking member.

9. The caster of claim 5, wherein said braking member is mounted on and is adjustable relative to said shifting member in the direction of said swivel axis, and further comprising means for adjusting said braking member relative to said shifting member.

10. The caster of claim 9, wherein said adjusting means includes a wedge which is movably installed in said braking member, said shifting member having at least one follower portion engaging with and movable by said wedge in response to movement of said wedge with reference to said braking member.

11. The caster of claim 10, wherein said wedge has two mutually inclined surfaces one of which engages with said follower portion and the other of which engages with a portion of said braking member.

12. The caster of claim 5, wherein said shifting member includes a first threaded portion and said braking member includes a second threaded portion mating with said first threaded portion, one of said threaded portions being rotatable with reference to the other of said threaded portions to thereby move said braking member relative to said shifting member in the direction of said swivel axis.

13. The caster of claim 5, wherein said shifting member includes an end portion extending from said carrier and said actuating means further comprises means for moving said end portion of said shifting member in the direction of said swivel axis.

14. The caster of claim 13, further comprising a housing for said end portion of said shifting member, said moving means including a cam rotatably mounted in said housing and said end portion of said shifting member being arranged to track said cam.

15. The caster of claim 1, wherein said second component includes a lever pivotably mounted in said frame and having an arm moveable into and from engagement with said first component in response to pivoting of said lever.

16. The caster of claim 15, wherein said lever includes a braking portion movable into and from frictional engagement with said wheel in response to pivoting of said lever.

17. The caster of claim 16, further comprising means for yieldably biasing said lever to an angular position in which said braking portion is disengaged from said wheel.

18. The caster of claim 17, wherein said actuating means comprising means for pivoting said lever relative to said frame.

19. The caster of claim 18, wherein said pivoting means includes a cam turnably mounted in said frame and having a cam face, said lever having a follower tracking said cam face and said cam face including a first portion which is engaged by said follower when said biasing means is free to disengage the braking portion from said wheel, a second portion which is engaged by said follower when said arm engages with said first component, and an intermediate portion which must be tracked by said follower against the opposition of said biasing means in order to engage said follower with one of said first and second portions.

* * * * *